(12) United States Patent
Chang et al.

(10) Patent No.: US 8,776,870 B2
(45) Date of Patent: Jul. 15, 2014

(54) TUNABLE THERMAL LINK (75) Inventors: Chih-Wei Chang, Berkeley, CA (US);
Arunava Majumdar, Orinda, CA (US);
Alexander K. Zettl, Kensington, CA (US)

(73) Assignee: The Regents of the University of California, Oakland, CA (US)

( * ) Notice: Subject to any disclaimer, the term of this patent is extended or adjusted under 35 U.S.C. 154(b) by 1216 days.

(21) Appl. No.: 12/436,253

(22) Filed: May 6, 2009

(65) Prior Publication Data
US 2009/0277609 A1 Nov. 12, 2009

Related U.S. Application Data (60) Provisional application No. 61/051,187, filed on May 7, 2008.

(51) Int. Cl.
*F28F 27/00* (2006.01)
*F28F 13/00* (2006.01)

(52) U.S. Cl.
USPC .............................. 165/96; 165/135; 165/185

(58) Field of Classification Search
USPC .......................................... 165/96, 185, 135
See application file for complete search history.

(56) References Cited

U.S. PATENT DOCUMENTS

| | | | |
|---|---|---|---|
| 3,732,916 A * | 5/1973 | Cope ................................ | 165/96 |
| 4,448,240 A * | 5/1984 | Sharon .......................... | 165/185 |
| 4,535,841 A * | 8/1985 | Kok ................................ | 165/185 |
| 5,641,466 A | 6/1997 | Ebbesen et al. | |
| 6,034,408 A | 3/2000 | Ghoshal | |
| 7,416,019 B2 * | 8/2008 | Osiander et al. ................ | 165/96 |
| 2002/0004136 A1 | 1/2002 | Gao et al. | |
| 2002/0070426 A1 | 6/2002 | Cumings et al. | |
| 2002/0179434 A1 | 12/2002 | Dai et al. | |
| 2003/0068432 A1 | 4/2003 | Dai et al. | |
| 2006/0086118 A1 | 4/2006 | Venkatasubramanian et al. | |
| 2007/0213419 A1 | 9/2007 | Cao et al. | |

FOREIGN PATENT DOCUMENTS

| | | |
|---|---|---|
| WO | 2004/040645 A1 | 5/2004 |
| WO | 2007/015719 A2 | 2/2007 |
| WO | 2008/042920 A2 | 4/2008 |

OTHER PUBLICATIONS

Chang, et al., "Solid-state thermal rectifier", Science, Nov. 17, 2006, vol. 314, pp. 1121-1124.
Jensen, et al., "Tunable nanoresonators constructed from telescoping nanotubes", Physical Review Letters, Jun. 2, 2006, 215503-1 to 215503-4.

(Continued)

*Primary Examiner* — Leonard R Leo
(74) *Attorney, Agent, or Firm* — David J. Aston; Peters Verny, LLP (57) ABSTRACT

Disclosed is a device whereby the thermal conductance of a multiwalled nanostructure such as a multiwalled carbon nanotube (MWCNT) can be controllably and reversibly tuned by sliding one or more outer shells with respect to the inner core. As one example, the thermal conductance of an MWCNT dropped to 15% of the original value after extending the length of the MWCNT by 190 nm. The thermal conductivity returned when the tube was contracted. The device may comprise numbers of multiwalled nanotubes or other graphitic layers connected to a heat source and a heat drain and various means for tuning the overall thermal conductance for applications in structure heat management, heat flow in nanoscale or microscale devices and thermal logic devices.

13 Claims, 5 Drawing Sheets

(56) References Cited

OTHER PUBLICATIONS

Kim, et al., "Thermal transport measurements of individual multiwalled nanotubes", Physical Review Letters, Nov. 19, 2001, vol. 87, No. 21, 215502-1 to 215502-4.

Li, et al., "Negative differential thermal resistance and thermal transistor", Applied Physics Letters, 88, 143501, (2006).

Yuzvinsky, et al., "Precision cutting of nanotubes with a low-energy electron beam", Applied Physics Letters, 86, 053109 (2005).

Chang, et al., "Tunable thermal links", Appl. Phys. Lett. 90 193114 (2007), pp. 1-3.

* cited by examiner

TUNABLE THERMAL LINK

STATEMENT OF GOVERNMENTAL SUPPORT

This invention was made with U.S. Government support under Contract Number DE-AC02-05CH11231 between the U.S. Department of Energy and The Regents of the University of California for the management and operation of the Lawrence Berkeley National Laboratory. The U.S. Government has certain rights in this invention.

CROSS-REFERENCE TO RELATED APPLICATIONS

This application claims priority from U.S. Provisional Patent Application No. 61/051,187 filed on May 7, 2008, which is hereby incorporated by reference in its entirety.

REFERENCE TO SEQUENCE LISTING, COMPUTER PROGRAM, OR COMPACT DISK

None

BACKGROUND OF THE INVENTION

1. Field of the Invention

The present invention relates to the field of nanomaterials such as carbon nanotubes and further to the field of thermal switches.

2. Related Art

Presented below is background information on certain aspects of the present invention as they may relate to technical features referred to in the detailed description, but not necessarily described in detail. The discussion below should not be construed as an admission as to the relevance of the information to the claimed invention or the prior art effect of the material described.

Unlike electrical resistivity, which can vary by more than $10^{12}$ from insulators to metals, thermal conductivity varies by less than $10^4$ from the best thermal conductors to the best thermal insulators. In addition, unlike typical field-effect transistors, which can change on-off resistances by more than $10^6$, no devices have been shown to exhibit tunable thermal conductance. This lack of variability and tunability of phonon transport in materials is the main obstacle for heat management and further processing of phonons as information carriers. Thus, there is a need in the art for devices that provide variable control of thermal conductance.

Specific Patents and Publications

Terraneo et al., "Controlling the energy flow in nonlinear lattices: A model for a thermal rectifier", *Physics Review Letters*, 88, 094302 (2002), describes a model of a thermal diode based on resonance. In the model, a nonlinear material with a resonant frequency that depends strongly on temperature was sandwiched between two nearly linear segments, the frequencies of which exhibit little variation with temperature. The model suggests that the frequencies of materials match one another when a temperature drop is introduced in one direction and mismatch one another when the temperature drop is in the other direction, thus allowing heat to flow through the sandwich in one direction but not the other.

Li et al., "Thermal diode: Rectification of heat flux," *Physics Review Letters*, 93, 184301 (2004), expands on Terraneo's model by using segments made up of a chain of particles subject to a sinusoidal potential. This model also reduced the number of segments from three to two. The model increased the rectification effect by up to three orders of magnitude.

Chang et al., "Solid-state thermal rectifier," *Science*, 314, 1121 (2006) describes a nanoscale solid-state thermal rectifier. The rectifier uses high-thermal-conductivity carbon or boron nitride nanotubes mass-loaded externally and inhomogeneously with heavy molecules.

Li et al., "Negative differential thermal resistance," *Appl. Phys. Lett.*, 88, 143501 (2006) describes a model of a thermal transistor to control heat flow. The thermal transistor comprises a three-terminal device with the important feature that the current through the two terminals can be controlled by small changes in the temperature or in the current through the third terminal. This control feature allows switching of the device between "off" (insulating) and "on" (conducting) states or to amplify a small current U.S. Pat. No. 6,034,408, "Solid state thermal switch," issued to Goshal, describes a solid-state thermal switch providing thermal conductivity in the on state and enhanced thermal isolation in the off state. The device includes a cracked, thin semiconducting layer that has a drain and a source etched into it.

Cumings et al. US 2002/0070426 A1 discloses a method for forming a telescoped multiwall carbon nanotube ("MWCNT"). Such a telescoped multiwall nanotube is shown in this publication to act as a linear bearing in an electromechanical system. That is, the walls of a multiwalled carbon nanotube are concentrically separated and are shown to telescope axially inwardly and outwardly. In *Science* 289: 602-604 (28 Jul. 2000), a scientific publication related to the 2002/0070426 A1 patent publication, Cumings and Zettl describe a low friction nanoscale linear bearing, which operates in a reciprocal (i.e., movable) manner.

Barreiro et al., "Subnanometer Motion of Cargoes Driven by Thermal Gradients Along Carbon Nanotubes," Science 320 775-778 (May 9, 2008) describes an artificial nanofabricated motor in which one short carbon nanotube moves relative to another coaxial nanotube. A cargo is attached to an ablated outer wall.

BRIEF SUMMARY OF THE INVENTION

The following brief summary is not intended to include all features and aspects of the present invention, nor does it imply that the invention must include all features and aspects discussed in this summary.

As described below, the present invention involves a finding that that small movements which cause increased or decreased longitudinal (axial) separation caused by telescoping outer layers of an MWNT ("multiwalled nanotube") or related structure have a large effect on thermal conductivity ("K"), in view of the very high K values which carbon nanotubes (essentially rolled up graphitic sheet) have been shown to possess. That is, the MWNT structures described below do not behave as conventional thermal conductors. Sliding concentric (conventional) metallic cylinders, even with a large thermal conductance, would not show this effect. Nonlinearity and short phononic localization length are two important properties of nanotubes. If nanotubes were traditional thermal conductors, the reduction of thermal conductance would scale linearly with separation length. The range of tunability is a function of the phononic localization length. The phononic localization length can depend on the size of the gap or the number of nanotube walls being compromised.

The fact that nanotubes are not traditional thermal conductors can be seen from the nonlinear response curve for increasing separation. This is shown in FIG. 4 and confirmed by computer simulation, as discussed below. Without wishing to be bound by any particular scientific theory, it is believed that the large effect in thermal conductance is due to the short phonon localization length (~74 nm). That is, comparing the phonon localization length to the electronic localization length (1000~1500 nm), a much shorter phononic localization length results in a larger change of thermal resistance. As shown in FIG. 4, thermal conductance dropped approximately 80% when the test MWCNT was extended only about 190 nm. This provides exceptional thermal control. Further, the thermal conductivity was restored when the nanotube was contracted. Thus, one may see that the heat transfer is reduced by at least 50% by expanding said exposed portion gap by about 200 nm. This may be observed as a change of about 85% at 200 nm change, or in a range of 50% to 100% drop when measured over a distance change of 100 to 300 nm. A "gap" may be a gap between separated portions of an outer wall, as shown in FIG. 3. Also, as can be understood from the present description, the gap may be caused by relative axial motion between adjacent nanostructures, increasing or decreasing the area of contact between the adjacent nanostructures.

As is known in the art, thermal conductivity involves energy transferred both by lattice vibrations (phonons) and conduction electrons. In metals, heat transfer is primarily carried out by electrons. In insulators, it is carried out by phonons (lattice vibrations). In semiconductors, conduction heat transfers a mixture of phonon and electronic heat transfer.

The present invention, in certain aspects, comprises a device comprising a nanoscale device for varying heat transfer, comprising: a structure having a continuous first axial length and a discontinuous second axial length, permitting relative movement of layers to form an exposed portion; The structure may be exemplified as an MWNT, but is generally a multiwalled nanotube structure, or an aggregate of smooth nanostructures which may be formed in several ways described below. The device further will utilize a heat source attached to one axial end of the multiwalled nanotube structure; a heat drain attached to an opposite end of the multiwalled nanotube structure; and a moveable member for expanding and/or contracting said exposed portion gap to reduce and/or increase, respectively, the phonon heat transfer. Thus there is provided a tunable nanoscale thermal link for phonon heat transfer which can modulate phonon heat transfer over a range of at least two fold, preferably at least five fold.

Figure 5:
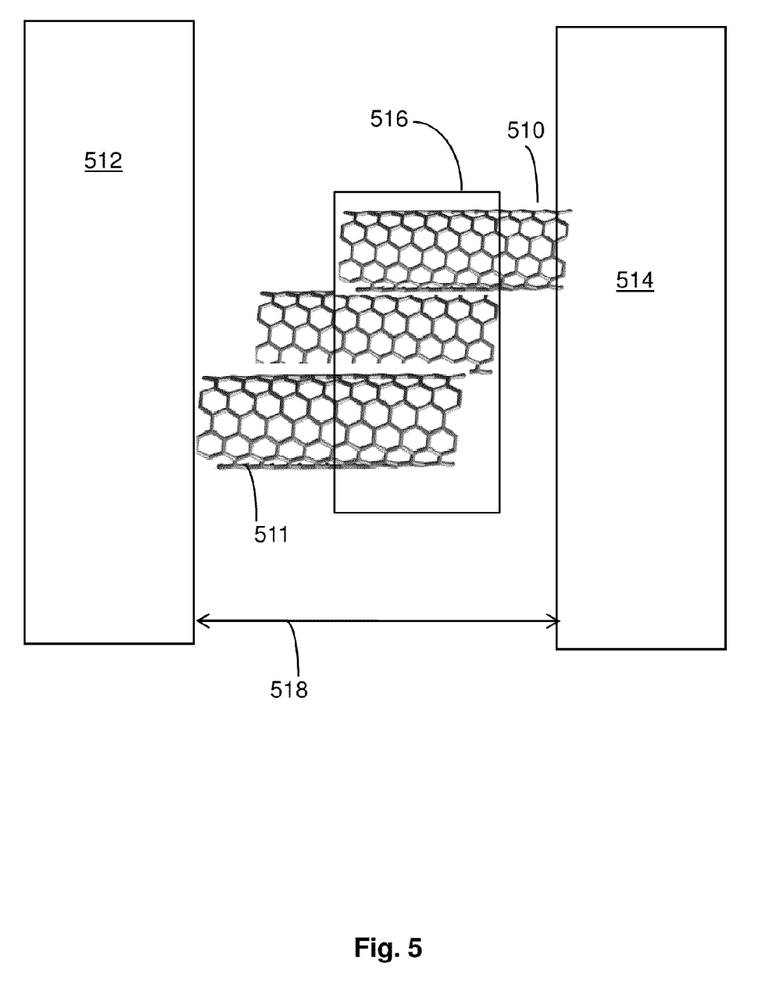
FIG. 5 shows a schematic illustration of a thermal link embodiment in which either telescoping or sliding between adjacent nanotubes acts as a tunable thermal link.

The nanotube structure may comprise an MWCNT, or other multiwalled nanotube, or nanotube slidable bundles or fibers. The device may be constructed with one nanotube structure, or with an array of independent multiwalled nanotubes in parallel. The device may comprise an array of graphitic sheets, where the sheets are rolled into nanotubes, and the nanotubes are packed axially into a bundle, as in nanotube ropes, and as shown in FIG. 5. An array of graphitic sheets will have the sheets stacked in contact along their lengths, preferably close enough to interact by van der Wals forces. The array may comprise a leaflet of closely packed nanoscale graphitic sheets, where the sheets may be moved relative to each other. The device may be incorporated into an insulating layer for use in insulation applications. It is tunable by expanding and contracting the multiwalled nanotube structure, and so the device may include a control, such as a MEMS device capable of operating over a short distance. Expanding the gap increases insulation.

In one application, the present device comprises an integrated circuit attached to a heat sink, whereby the device carries away heat from the integrated circuit.

Tuning may be carried out by a piezoelectric device which vibrates to move the multiwalled structure into an expended or contracted state. The piezoelectric device acts as a control for controlling the gap.

The multiwalled nanotube structure may comprise non-concentric walls, e.g., slidable radially attached tubes, or attached MWNTS, where adjacent MWNTS are expanded at one end or the other. These may be adjacent single walled nanotubes, as illustrated, e.g., in FIG. 5.

In certain aspects, the present invention comprises a method for making a tunable thermal link, comprising the steps of obtaining a multiwalled nanotube structure; breaking at least one outer layer but not inner layers of said multiwalled nanotube, thereby forming a movable multiwalled nanotube; mounting the telescoping nanotube to a heat source on one end and a heat drain on an opposite end, at least one of the heat drain or the heat source being moveable in relation to the other. The breaking of the outer walls may be done with an electron beam.

In certain aspects, the present invention comprises a method for controlling heat flow comprising the steps of attaching a movable nanotube structure having a variable length to a heat source at one end of its length and a heat drain at the other end of its length; and moving one end relative to the other end, whereby movement of the ends closer together increases heat flow, and movement of the ends farther apart decreases heat flow.

The present device may be tuned after installation, by moving the ends. In addition, one may repeatedly tune the thermal conductance by repeatedly moving the ends closer together and farther apart. Due to the low friction on the nanoscale, this may be done at high frequencies, i.e., 1 MHz to over 1 GHz. Due to the phonon transport properties of the present device, such movement reduces heat flow by at least a factor of two to five. Further, as shown in FIG. 4, the drop in heat flow is greater than linear.

In certain aspects, the present invention may comprise a method for making a tunable thermal link, comprising a step of preparing layered graphitic nanostructure structure. This structure is described further below in connection with FIG. 5. The method further involves breaking at least one layer but not other layers of said layered graphitic nanostructure, thereby forming a movable layered graphitic nanostructure. In a layered structure, one would distend and separate the adjacent layers. The method further comprises mounting the movable layered graphitic nanostructure to a heat source on one end and a heat drain on an opposite end, at least one of the heat drain or the heat source being moveable in relation to the other. The layered graphitic structure may be a layered graphene sheet, clusters of SWNTs, clusters of MWNTs, etc.

BRIEF DESCRIPTION OF THE DRAWINGS

FIG. 1 is a schematic representation of embodiments the present tunable thermal link, as applied to insulation (FIG. 1A) and as applied to a thermal transistor (FIG. 1B).

FIG. 3 is a schematic diagram of processing a multiwalled carbon nanotube (MWCNT) in which an MWCNT is mounted at its ends (FIG. 3A), is nicked or notched by an e-beam (FIG. 3B) and is separated in a telescoping effect (FIG. 3C) whereby the MWCNT is lengthened and a portion of its length comprises only the inner layers of the MWCNT, several outer layers having been removed.

DETAILED DESCRIPTION OF THE PREFERRED EMBODIMENT

Definitions

Unless defined otherwise, all technical and scientific terms used herein have the same meaning as commonly understood by those of ordinary skill in the art to which this invention belongs. Although any methods and materials similar or equivalent to those described herein can be used in the practice or testing of the present invention, the preferred methods and materials are described. Generally, nomenclatures utilized in connection with, and techniques of, cell and molecular biology and chemistry are those well known and commonly used in the art. Certain experimental techniques, not specifically defined, are generally performed according to conventional methods well known in the art and as described in various general and more specific references that are cited and discussed throughout the present specification. For purposes of the clarity, following terms are defined below.

"Nanoscale" means a size less than 1 μm (1000 nm). By way of example, carbon nanotubes (which may have a length to diameter ratio on the order of 10-30 million) may have a diameter of a few nanometers (SWNT) up to about 420 nm (MWNT).

"MWCNT" means a multiwalled carbon nanotube, as discussed below.

"Phonon heat transfer," as discussed below, refers to a quantum mechanistic model of heat transfer in non-metallic solids, where the heat is propagated by lattice vibrations. A phonon is a quantized mode of vibration occurring in a rigid crystal lattice, such as the atomic lattice of a solid. It is understood that phonons may be made applicable, as are electrons, to electronic like devices.

"Multiwalled nanotube structure" means an elongated structure having a diameter on the order of 2-100 nm (typically 10-50 nm) and a length on the order of microns, wherein the material is ordered on an atomic level within a wrapped sheet (tube) or the like. The structure comprises an "inner axial length" and an "outer axial length" in that the preferred embodiment uses concentric MWNTs. However, the term is meant to include concentric and nonconcentric nanotube structures, as wells as parallel sheets, as described below, in which case the structure may be termed a layered graphitic nanostructure. The structure is in all cases tunable by moving one wall relative to another, and the walls are in close proximity, preferably direct atomic contact, to permit phonon transfer between the walls, and phonon transfer along the walls, as described in detail below.

Overview

The preferred material for the present nanoscale tunable thermal link is multiwalled carbon nanotube (MWCNT). MWCNTs have a near perfect carbon tubule structure that resembles a sheet of $sp^2$ bonded carbon atoms rolled into a seamless tube.

They are generally produced by one of three techniques, namely electric arc discharge, laser ablation and chemical vapor deposition.

The arc discharge technique involves the generation of an electric arc between two graphite electrodes, one of which is usually filled with a catalyst metal powder (e.g., iron, nickel, cobalt), in a Helium atmosphere. A detailed procedure of an arc technique is described in Ebbesen et al. U.S. Pat. No. 5,641,466 issued Jun. 24, 1997, for large-scale synthesis of carbon nanotubes. In an inert gas at a pressure of 200-2500 torr, an arc discharge is made between two carbon rod electrodes by application of a suitable AC or DC voltage (e.g., about 18 V) to thereby produce a carbon plasma. The electric current is about 50-100 A. As the result a carbon deposit forms on the end of one of the two carbon rods, and a core part of the carbon deposit contains a large amount of carbon nanotubes. This core part can easily be separated from a shell part in which no carbon nanotubes exist. Usually carbon nanotubes occupy more than 65 wt % of the core part of the deposit, and the nanotubes coexist with some (less than 35 wt %) carbon nanoparticles, which are nanometer-scale carbon particles with polyhedral cage structures. Sometimes a small amount of amorphous carbon also coexists. These nanotubes have a near perfect carbon tubule structure that resembles a sheet of $sp^2$ bonded carbon atoms rolled into a seamless tube.

The laser ablation method uses a laser to evaporate a graphite target, which is usually filled with a catalyst metal powder too. The arc discharge and laser ablation techniques tend to produce an ensemble of carbonaceous material which contain nanotubes (30-70%), amorphous carbon and carbon particles (usually closed-caged ones). The nanotubes must then be extracted by some form of purification process before being manipulated into place for specific applications.

The chemical vapor deposition process utilizes nanoparticles of metal catalyst to react with a hydrocarbon gas at temperatures of 500-900° C. A variant of this is plasma enhanced chemical vapor deposition in which vertically aligned carbon nanotubes can easily be grown. In these chemical vapor deposition processes, the catalyst decomposes the hydrocarbon gas to produce carbon and hydrogen. The carbon dissolves into the particle and precipitates out from its circumference as the carbon nanotube. Thus, the catalyst acts as a 'template' from which the carbon nanotube is formed, and by controlling the catalyst size and reaction time, one can easily tailor the nanotube diameter and length respectively to suit. Carbon tubes, in contrast to a solid carbon filament, will tend to form when the catalyst particle is ~50 nm or less because if a filament of graphitic sheets were to form, it would contain an enormous percentage of 'edge' atoms in the structure.

Alternatively, nanotubes may be prepared by catalytic pyrolysis of hydrocarbons as described by Endo, et al., in *J. Phys. Chem. Solids,* 54, 1841 (1993), or by Terroner, et al., in *Nature,* 388, 52 (1997) or by Kyotani, et al., in *Chem. Mater.,* 8, 2190 (1996), the contents of all of which are incorporated by reference.

The bonding in carbon nanotubes is $sp^2$, with each atom joined to three neighbors, as in graphite. The tubes can therefore be considered as rolled-up graphene sheets (graphene is an individual graphite layer). There are three distinct ways in which a graphene sheet can be rolled into a tube. The first two of these, known as "armchair" and "zig-zag" have a high degree of symmetry. The terms "armchair" and "zig-zag" refer to the arrangement of hexagons around the circumference. The third class of tube, which in practice is the most common, is known as chiral, meaning that it can exist in two mirror-related forms. The various structures determine the conductivity of the nanotube, which may be "metallic" or "semiconducting." Either form will work in the present invention.

The strength of the $sp^2$ carbon-carbon bonds gives carbon nanotubes particular mechanical properties. The stiffness of the material, measured in terms of its Young's modulus, the rate of change of stress with applied strain, can be as high as 1000 GPa, which is approximately 5× higher than steel. The tensile strength, or breaking strain of nanotubes can be up to 63 GPa, around 50× higher than steel. These properties, coupled with the lightness of carbon nanotubes make them particularly preferred in the present thermal link.

Multiwalled nanotubes (or graphitic sheets) may contain 100 to 1000 atomic layers. Multiwalled nanotubes have excellent strength, small diameter (typically less than 200 nm) and near-metallic electrical conductivity. In addition, MWNTs with as few as two layers would serve in the present applications.

Other forms of nanotube may be used, so long as they have uniform mechanical and thermal properties and comprise multiple walls. For example, $BC_2N$ or BN nanotubes, as described in Zettl, "Non-Carbon Nanotubes," *Adv. Mat.*, 8(5): 443-445 (1996) may be used. Multiwalled nanotubes made of boron nitride are also described in Goldberg et al., "Multi-walled boron nitride nanotubes composed of diverse cross-section and helix type shells," *Applied Physics A: Materials Science & Processing*, Volume 88, Number 2/August, 2007, and references cited there. Other materials include titanium dioxide (See, "Microstructure and formation mechanism of titanium dioxide nanotubes e.g., Wang et al. Microstructure and formation mechanism of titanium dioxide nanotubes," *Chem. Phys. Lett., Volume* 365, Issues 5-6, 13 Nov. 2002, Pages 427-431); silicon, gallium nitride, or other materials which have good phonon transmission properties within a layer and poor phonon transport between layers. Phonon localization may be determined, e.g., as described in Perrin, "Phonon localization in two-dimensional self-supported films," *Phys. Rev. B*, Vol. 48(16): 12151-12154 (1993). The range of tunability is also a function of the phononic localization length. The phononic localization length can depend on the size of the gap or the number of nanotube walls being compromised.

Also, sliding nanotube structures in which the tubes are nonconcentric may be designed using the principles described here. One could have two single wall nanotubes in parallel (or two fully independent multiwall nanotubes), where the walls of different tubes are in contact, and one tube slides axially with respect to the other to alter the overlap area between adjacent tubes. Single walled nanotubes may be joined in slidable fashion, as in a fiber or in a sheet (so-called Buckypaper). An example of a sheet is found in Zhang et al., "Strong, Transparent, Multifunctional, Carbon Nanotube Sheets," *Science* 309 (5738): 1215-1219 (1995). Adjacent sheets could be slid relative to each other. Further guidance in preparing materials in accordance with the present concepts is found in Falvo et al., "Nanometer-scale rolling and sliding of carbon nanotubes," *Nature* 397, 236-238 (21 Jan. 1999).

FIG. 5 shows an embodiment analogous to that shown in FIG. 1, where the nanotubes are used as tunable thermal links between an object being heated and a heat sink, i.e. the object to which a variable degree is to be transferred. The objects providing and receiving heat through the thermal links are illustrated at 512 and 514, and may represent an electronic structure (e.g. transistor) or building walls, etc. as described above. Between the heat receiving and heat providing objects is an array or cluster of graphitic nanostructures, preferably nanotubes, preferably MWCNTs, but SWNTs (as illustrated) may also be used. It is primarily important that the nanomaterials used have high thermal conductivity through intact structures and low thermal conductivity when heat has to change between adjacent layers. As described, this is thought to involve nonlinearity and short phonon localization. Thus, as much as about a ten fold decrease in thermal conductivity can be produced by a movement of less than about 200 nm extending or retracting gaps between material layers.

In a multilayer cluster embodiment as shown in FIG. 5, a number of nanotubes as shown at 510, 511 are packed tightly against each other so that their walls touch along a substantial portion of their length. The nanotubes have an area of overlap as indicated at box 516. Extending beyond the area of overlap, some tubes 511 contact one wall 512, and some tubes 510 contact the opposing wall 514. When the walls are closer together, there is a larger area of overlap (i.e. within box 516) and greater heat transfer. When the walls separate, as shown by the arrow 518, phonon heat transfer is disrupted by more inter-tube transfers, and when the walls are brought closer together, phonon heat transfer is facilitated by close contact between adjacent walls in greater area. This embodiment can use the above mentioned sheets or bundles of nanotubes. The bundle may be formed by teasing apart a bundle of nanotubes to produce an array in which individual nanotubes substantially fail to touch both walls. E-beam precision cutting may be used to cut notches in the nanotubes or stacked sheets, the method being further described in Yuzvinsky et al., "Precision cutting of nanotubes with a low-energy electron beam," *App. Phys. Lett* 86, 053109 (2005). In certain embodiments, graphene layers held together by pi bonding are modified such that portions of the binding are disrupted and the sheets are torn, nicked, etc. The sheets may be formed from unrolled MWNTs and will generally have nanoscale dimensions.

In addition, the present tunable thermal links may be formed by nicking, or notching (as described below) nanotubes that have been covalently modified to contain other atoms ordered structures regularly covalently bonded as in the MWNT $sp^2$ structure.

In another alternative embodiment, the nanotube center may be filled with a conductive filler, as described for example in Gao et al. US PUB 2002/0004136, entitled Carbon Nanotubes On A Substrate, published Jan. 10, 2002. The nanotube link may be adapted to pass current between two conductive elements as described in Dai et al. US PUB 2002/0179434, published Dec. 5, 2002, or disposed on a silicon substrate for providing electrical contacts, as described for example in Dai et al. US PUB 2003/0068432, published Apr. 10, 2003.

In another alternative embodiment, one or more nanotubes may be attached to a gold nanoparticle, or similar conductive metal. The gold nanoparticle may be confined inside a nanotube or on the outside wall of the nanotube. An outer wall may be fractured or removed, as described here, permitting the outer wall to move relative to inner walls. Upon fracture of an outer wall, permitting it to move relative to inner walls, a thermal gradient between ends of the nanotubes (as described below) may be created, e.g. by heating one end of the nanotube. The thermal gradient may be used to generate a phononic current in one wall (or one adjacent wall) that hits and drags the second wall, as described. The metal nanoparticle attached to a wall moves with the nanotube wall. The movement may be axial or rotational. Current through the nanotube can be used to effect the movement of the wall bearing the nanoparticle, (preferably the outer wall), but the movement does not appear to be caused by the current itself. (See Barreiro et al., "Subnanometer Motion of Cargoes Driven by Thermal Gradients Along Carbon nanotubes," *Sci-*

*ence* 320 775-778 (May 9, 2008) for details of fabrication of a nanotube bearing a gold particle which is made to move an outer multiwalled nanotube relative to inner walls.)

The present tunable thermal link may also be a multiwalled nanotube formed upon a substrate. That is, the presently disclosed multi walled nanotubes may be formed on a substrate, which will be a heat source or a heat drain. An array of nanotubes may be thus formed. While it is contemplated that the nanotubes will be individually free standing, so as to permit telescoping, small bundles of nanotubes may also be prepared with central nicks through the majority of tubes, the remainder being fractured by pulling. In addition, an array of essentially parallel nanotubes may be used, where there is an expandable filler between the nanotubes, which filler serves to stabilize the nanotubes in position, and acts with greater insulating properties, when expanded, such as by filling with air to expand, as in a foam. Standard carbon nanotubes (without telescoping) may be prepared as a foam. Details are set forth in US 20070213419 by Cao, et al., entitled "Super-compressible carbon nanotube films and micro-bundles," published Sep. 13, 2007, and the background information therein.

Figure 1A:
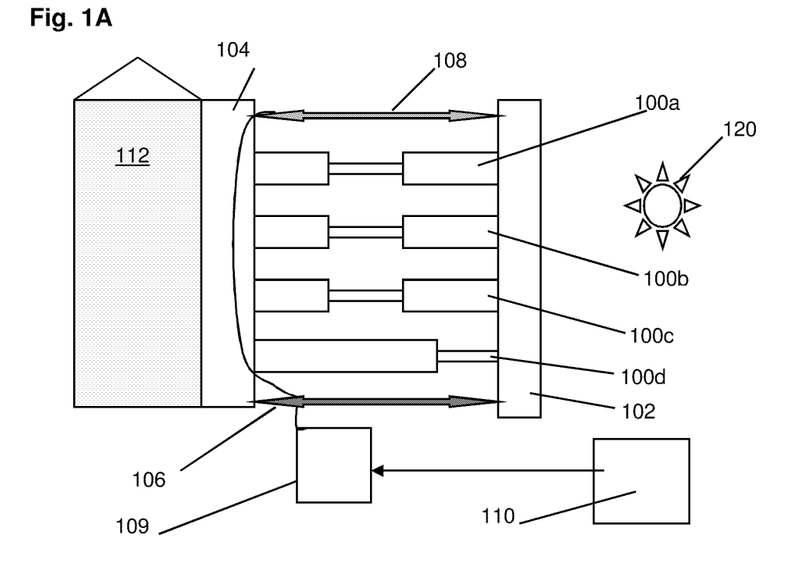

The present tunable thermal links have application in a variety of devices. Referring now to FIG. 1A, there is schematically illustrated a heat management system employing an array of telescoping nanotubes, shown for purposes of illustration as 100A-D. In fact, there may be billions of nanotubes in an axially parallel array, with or without interstitial support. Parallel arrays of MWCNTs may be produced by the chemical vapor deposition method on a suitable catalyst. In the process of notching the MWCNTs, it is not necessary to notch each MWCNT in the same location, where, for example small bundles of MWCNTs are present. Also, as illustrated at 100*d*, the MWNTs do not have to be uniformly gapped, and may be exposed at one end to allow the inner layers to be contacted at one end to a heat source or heat drain. These MWNTS may be prepared by compromising the ends of the MWNTs, as referenced above in Cummings et al. US 2002/0070426. This design would utilize MWNTs in which the inner layers are withdrawn as the structure is extended. An important requirement is to have (at least) one layer of nanotube sliding against the other layer, so that phonons are forced to propagate between layers (where only weak Van de Waals interaction exists) rather than staying in the same layer (where the strong $sp^2$ bonding dominates). The interlayer phonon scattering will result in a dramatic change of thermal conductance. The same thermal control could be accomplished in a double walled nanotube, or in two or more single walled nanotubes which slide axially relatively to each other and are closely joined.

It is also acceptable to have more than one ring notch (i.e., more than one telescoping outer gap) in a nanotube, for purposes of tunable heat transfer. Again referring to FIG. 1A, nanotubes 100*a*-100*d* extend between an outer wall 102, such as an outer wall of a structure, and an inner wall 104. The structure walls 102, 104 comprise, for example, a sheet of insulation which would have a thickness on the order of 1 mm to 1 cm. The two structure walls are connected by actuators 106, 108, illustrated as mechanically driven screws which cause the walls 102, 104 to come closer together or farther apart. That is, the actuators are connected to an outer wall and/or an inner structure wall and may move to compress or expand the distance between them. As described above, the thermal conductance will drop significantly as a result of even a small increase in separation in nanotube walls, resulting in extending the telescoped nanotubes. While a screw mechanism is illustrated, any number of micro-machined devices could be used, including expandable materials, piezoelectric materials, clamps, pins, etc. These various devices and others described below may be termed "movable members" and have the effect of causing the nanotube to telescope inwardly or outwardly. In the present embodiment, a separate motorized control 109 causes the structure walls 102, 104 to come in to closer or farther proximity. A sensor 110 is exposed to the exterior of the wall, which may have as an interior a living space 112. The sensor 110 senses a drop in exterior temperature, such as when sun 120 is blocked from shining on outer wall 102, and allows the walls to expand, thereby retaining heat inside the living space 112. At other times of day, for example in the summer, the walls can expand for the purpose of preventing sunlight from heating the house. Such controls are well known, as well as programs for thermal regulation.

This embodiment could also employ actuators (movable members) 106, 108 that are directly responsive to thermal conditions to appropriately allow or block thermal transmission between the two walls.

It can be readily seen from the above, that such a configuration could be adapted to other devices, including, for example microfluidics, where heat and mass transfer are significant issues. See, for example, WO/2004/040645 "Microfluidic heat exchanger for localized temperature control." As described there, heat exchange may be accomplished by the counterflow of two fluids divided by a partition. By using a controllable partition as described above, the degree of heat exchange could be more precisely controlled. In addition, heat could be delivered to a "lab on a chip" device for performing PCR, where heating and cooling cycles are required. Other heat dependent chemical reactions could also be controlled, on a nanoliter scale.

Another embodiment of the present tunable thermal link utilizes thermally expansive material fixed to one end of the telescoping nanotube(s) to provide a feed back to the link. That is, if the ends of the link are anchored within and to the ends of an elongated thermally expansive material, increasing heat would cause the material to expand, extending the telescoped MWNT, and decreasing heat transfer through the MWCNT. If one end of the nanotube(s) is attached to one exterior thermally expansive material, expansion of this material would shorten the tunable thermal link and cause the increased heat to be transferred to the heat drain.

Another embodiment, related to electronic circuits, as discussed below, involves the uses of the present tunable thermal links to connect integrated circuits (IC) components to a heat sink. At present, ICs are simply glued to a heat sink. By incorporating tunable thermal links into such a material, one could precisely control the amount of heat taken away from the IC. In addition, one could incorporate differently telescoped nanotubes in different formulas to permit higher heat conductance where needed, at so-called "hot spots." Hot spots can be identified by thermal imaging and the thermal linkage to the heat sink modified accordingly. Further disclosure regarding managing hot spots is contained in US 2006/0086118.

Figure 1B:
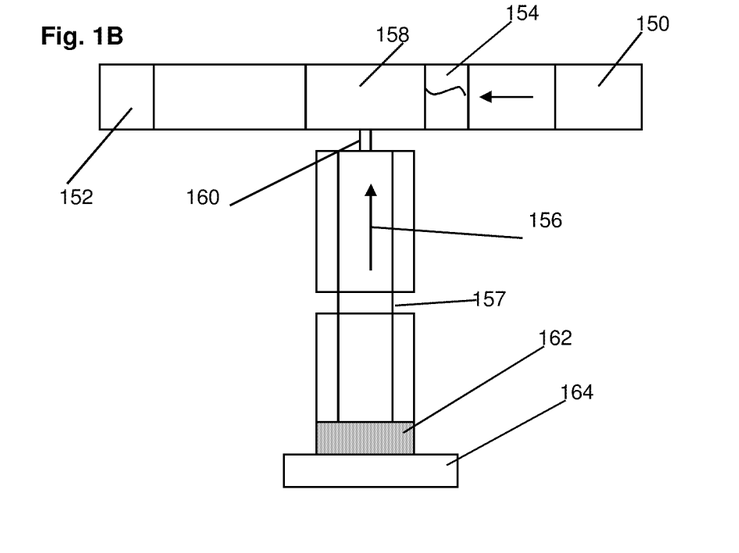

FIG. 1B illustrates another embodiment of the present device, where the present tunable thermal linkage is part of a thermal transistor. This embodiment utilizes carriers of heat (phonons) like carriers of electricity (electrons) in miniature electronic devices. At the present time, thermal diodes, thermal transistors and thermal logic gates, which are the basic components of functional thermal devices, have been built. Such components create the possibility to use heat to process information. Terraneo et al., "Controlling the Energy Flow in Nonlinear Lattices: A Model for a Thermal Rectifier," *Phys. Rev. Lett.*, 88, 094302 (2002) describe a method which controls heat conduction by nonlinearity. A solid-state thermal rectifier is described also in WO/2008/042920, published 10 Apr. 2008, by the present inventors. This work is also described in *Science* 17 Nov. 2006: Vol. 314, No. 5802, pp. 1121-1124.

Thermal transistors, having three terminals: the drain, the source and the gate, have also been designed. When the temperature at the drain and the source is fixed, the thermal current passing from one to the other is controlled by the temperature at the gate. If the transistor is to amplify the signal, then changes in the heat current through the gate need to induce an even larger change from the drain to the source so that the transistor can amplify the signal. Generally speaking, the larger the temperature drop, the larger the heat current, which is called a positive differential thermal resistance. However, a thermal transistor can only amplify a heat current if it has a negative differential thermal resistance (NDTR), which means that a large temperature drop leads to a small heat current and a small temperature drop leads to a large heat current. NDTR is possible because heat does still flow from hot to cold. NDTR in a system based on the same resonance phenomenon that makes thermal diodes possible, thereby realizing a thermal transistor is described in Li et al., "Negative differential thermal resistance and thermal transistor," *Appl. Phys. Lett.*, 88 143501 (2006). The key part of the device consists of a material made up of two segments with different resonant frequencies, similar to that of a thermal diode. The authors, as reported in Physics World.com, February 2008, had already detected a weak NDTR effect when they built the thermal diode, so all that was necessary to make a transistor was to adjust the parameters so that the effect was enlarged. Logic gates have also been built. Wang et al., "Thermal logic gates: Computation with phonons," *Physical Review Letters* 99 (17): Art. No. 177208 October 26 2007 discloses thermal logic gates that can perform similar operations as their electronic counterparts. The thermal logic gates are based on nonlinear lattices.

Further guidance in constructing thermal electronic-like devices may be found in Yang et al., "Thermal rectification and negative differential thermal resistance in lattices with mass gradient," *Phys. Rev.*, 76 (2): Art. No. 020301 July 2007. As described there, studies of thermal properties of one-dimensional (1D) harmonic and anharmonic lattices with a mass gradient found that a temperature gradient can be built up in the 1D harmonic lattice with a mass gradient due to the existence of gradons. The heat flow is asymmetric in anharmonic lattices with a mass gradient. Moreover, in a certain temperature region, negative differential thermal resistance is observed. Possible applications in constructing thermal rectifiers and thermal transistors by using the graded material are discussed.

Referring now to FIG. 1B, there is illustrated a thermal transistor having a heat current going from "drain" 150 to "source" 152, as analogized to an electronic transistor. The segments are coupled weakly as illustrated by segment 154. Segment 156 represents the gate coupled to the junction particle 158 by a coupling constant 160. A temperature at heat source 162 is used to control temperature at the junction 158, which determines the heat current from drain 150 to source 152. The device is implemented, as described in the above-referenced *Appl. Phys. Lett.*, 88:143501, in nanotubes on a substrate.

According to the present invention, segment 156 comprises a tunable thermal link, with a telescoping notch 157. The tunable thermal link is implemented as a telescoped MWNT and functions as segments 156 and 162, i.e., as a thermal conductor, with a source of heat attached. In addition, at 164, a piezoelectric element controls the amount of heat delivered by the gate, and thus controls the amplification of the device.

A number of piezoelectric materials are known. A piezoelectric material is basically a piece of polarized material (i.e., some parts of the molecule are positively charged, while other parts of the molecule are negatively charged) with electrodes attached to two of its opposite faces. When an electric field is applied across the material, the polarized molecules will align themselves with the electric field, resulting in induced dipoles within the molecular or crystal structure of the material. This alignment of molecules will cause the material to change dimensions. This phenomenon is known as electrostriction. In addition, a permanently-polarized material such as quartz ($SiO_2$) or barium titanate ($BaTiO_3$) will produce an electric field when the material changes dimensions as a result of an imposed mechanical force. Piezoelectric materials can be divided in 2 main groups: crystals and ceramics. The most well known piezoelectric material is quartz ($SiO_2$). Piezoelectric nanomaterials may also be utilized with the present thermal link, such as single crystalline barium titanate ($BaTiO_3$) nanowires having diameters down to several tens of nanometers.

An important aspect of the present invention is the tuning of the thermal link by controlling the degree that the nanotube is telescoped. This can be predetermined, or can be adjusted on the fly during operation of a device which utilizes heat. Due to the nanoscale of the device, friction is minimal, and rapid and continuous changes in thermal conductivity can be accomplished. Furthermore, thermal (phonon) conductance can be cycled at very rapid rates, e.g., in the GHz range. Nanoelectromechanical devices have been demonstrated to operate above 1 GHz (see X. M. H. Huang et al, *Nature,* 421, 496 (2003)). Operating the present tunable link at high frequencies, i.e., above 1 MHz is therefore possible.

In addition to piezoelectric materials, other means may be employed for opening and closing the gap in the outer shells of the present thermal link. The MWCNTs used here tend to close due to van de Waals forces, and need only be held apart. In principle, control forces opening and closing the gap can be designed as appropriate. Control can be based, for example, on the thermal effect on shape memory metals, or on external signals. For example, a swelling of a hydrogel or an increase in mass due to a biological or chemical event could be used to reduce thermal conduction in the present link.

EXAMPLES

Example 1

MWCNTs as a Thermal Nano-Mechanical Rheostat

MWCNTs with diameters ranging from 10 nm to 33 nm were prepared using conventional arc methods.

Individual tubes were placed on a custom designed microscale thermal conductivity test fixture using a piezo-driven manipulator operated inside an SEM. Details of the test fixture fabrication process have been published elsewhere (see Shi et al, "Measuring Thermal and Thermoelectric Properties of One-Dimensional Nanostructures Using a Microfabricated Device," *J. Heat Transfer,* 125, 881 (2003)). In brief, the fixture incorporates independently suspended heat source and heat sink pads, with integrated Pt film resistors serving symmetrically either as heaters or sensors (i.e., thermometers). The fixture was made adaptable to TEM imaging by wet etching a window through the exposed Si below the sample mount region. Nanotubes were bonded to the source/sink pads using (trimethyl) methylcyclopentadienyl platinum $((CH_3)_3(CH_3C_5H_4)Pt)$ for mechanical strength and to reduce contact thermal resistance.

Figure 2:
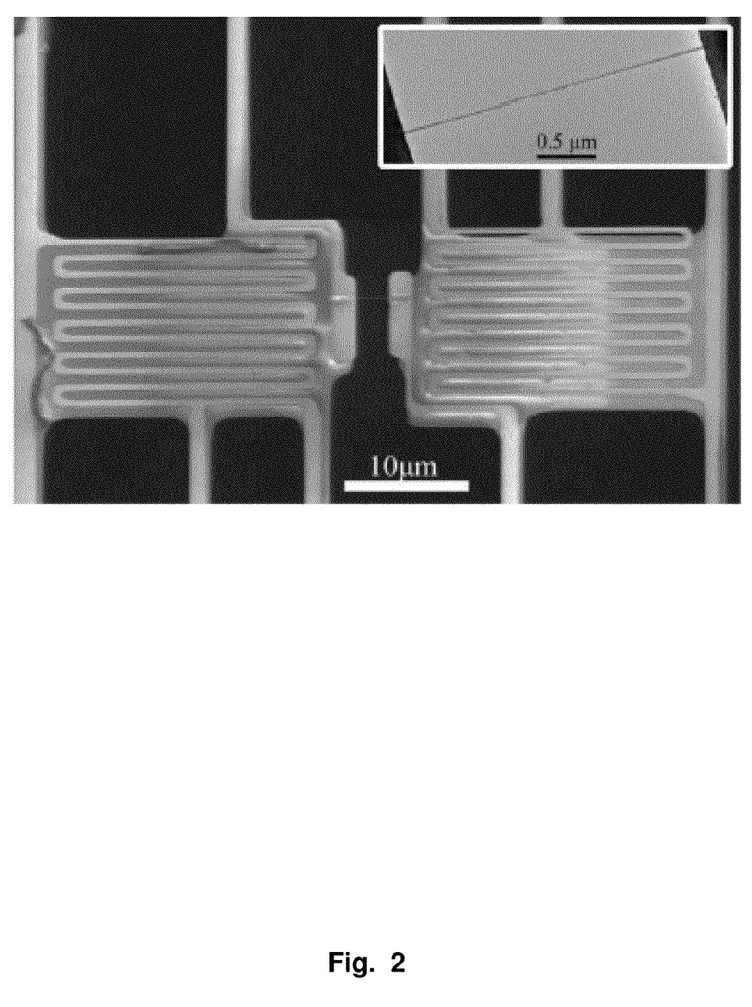
FIG. 2 is a scanning electron microscope (SEM) image of a multiwall carbon nanotube (MWCNT) mounted between heater and sensor pads of a thermal test fixture. The inset is a transmission electron microscope (TEM) image of the same MWCNT.

MWCNTs were bonded to the thermal source and sensor mounting pads of the test fixture using (trimethyl) methylcyclopentadienyl platinum $((CH_3)_3(CH_3C_5H_4)Pt)$ for mechanical strength and to reduce contact thermal resistance. The thermal conductance of individually suspended MWCNTs was determined from the known temperature gradient across the sample and the heat flow through the sample from the thermal source pad to the thermal sensor pad. The dimensions of the MWCNT were determined from SEM and associated high-resolution TEM images. FIG. 2 shows an SEM image of a MWCNT mounted between the test fixture thermal source and sensor pads. The nanotube is just visible in the center of the picture. The inset to FIG. 2 shows a low-resolution TEM image of the same MWCNT. This particular nanotube has a length of 2.73 µm, seven walls, and inner and outer diameters of 7.2 and 9.6 nm, respectively. To telescope the MWCNT, the entire sensor pad (right pad in FIG. 2, with meandering platinum thermal sensor and five flexible suspension arms attached) was displaced relative to the opposing thermal source pad using the nanomanipulator. The present device may be configured to contain one or more heat sensors at opposite ends of the nanotubes, which may be used to measure a thermal gradient along a nanotube. As shown in FIG. 2, the heater and sensor pads, separated by the length on the nanotube (about 3 µm), may be used to record their individual temperatures, and, thus, thermal resistance across a nanotube.

For thermal conductance measurements, the sample base temperature was regulated and a known power (P) was supplied to the heater. Resistance changes of the heater and sensor were used to determine the resulting temperature changes of the heater and sensor pads, $\Delta T_h$ and $\Delta T_s$. A blank device (with no nanotube present) was also used to determine the background heat leakage, subsequently used for data correction. Symmetrical measurements (switching the heater and sensor sides) were performed to estimate the error due to the asymmetry of the test fixture (generally <10%). The thermal conductance (K) of the nanotube was determined from $\Delta T_h$ and $\Delta T_s$ using the relation:

$$K = \frac{P}{\Delta T_h - \Delta T_s}\left(\frac{\Delta T_s}{\Delta T_h + \Delta T_s}\right) \quad (1)$$

The thermal conductivity was then evaluated by incorporating the nanotube length and the annular area between inner and outer nanotube radius, as determined from TEM imaging.

Figure 3A:
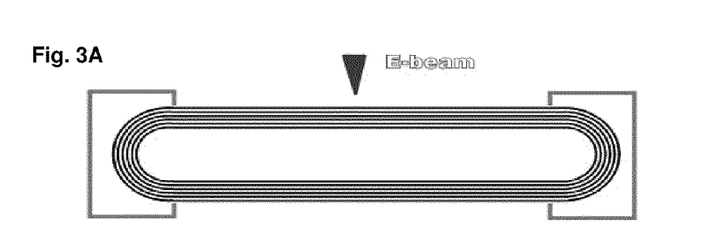
Figure 3B:
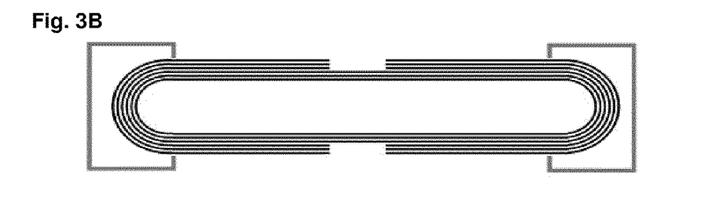
Figure 3C:
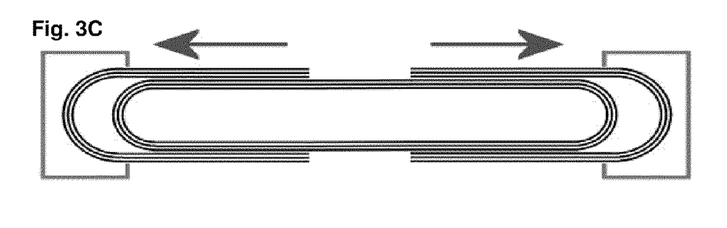
Figure 4A:
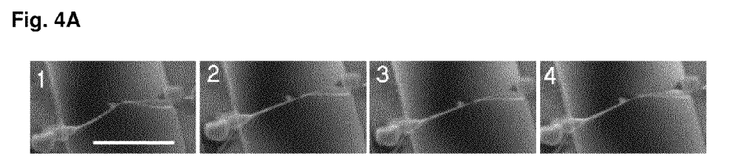
FIG. 4A shows SEM images of a MWCNT before extension (left), at the maximum extension, at maximum extension (center two pictures) and after retraction (right).
Figure 4B:
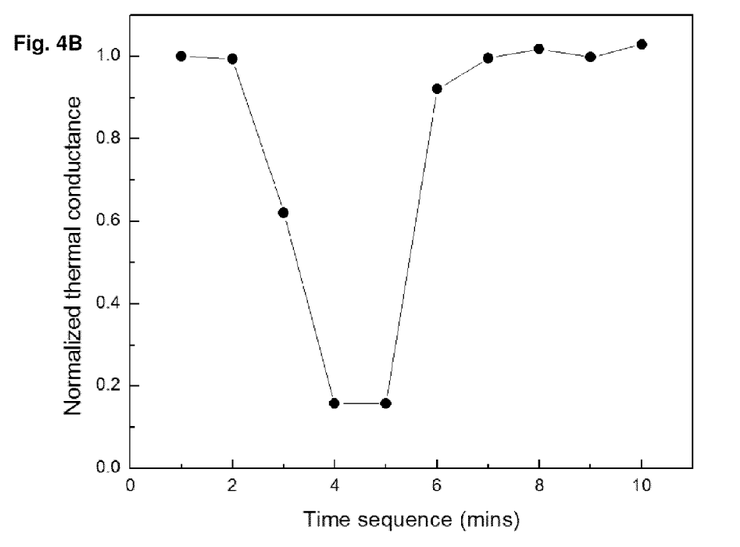
FIG. 4B is a graph showing normalized thermal conductance vs. distance x, for both telescopic extension and telescopic retraction of MWNCTs. Conductance drops from 1.0 to <0.2 during full extension (at least five fold).

FIG. 3 shows the schematic diagram of the experimental procedures. In FIG. 3A, it can be seen that the outermost layers of a MWCNT are anchored to the electrodes and then, as illustrated in FIG. 3B, the middle section of the MWCNT was partially cut using the electron beam of an SEM. Previous experiments have shown that the presence of $H_2O$ molecules facilitate the cutting time (see Yuzvinsky et al., "Precision cutting of nanotubes with a low-energy electron beam," *Appl. Phys. Lett.*, 86, 053109 (2005). But to avoid contamination, we did not introduce $H_2O$ molecules and the chamber vacuum was taken below $5\times10^{-6}$ mbar before turning on the electron beam. Under electron beam irradiation, parts of the outer-layers of the MWCNT were removed as shown in FIG. 3B. Thus the released outer-layer sections were weakly bonded to the inner cores via van der Waals interactions. In FIG. 3C, there is schematically illustrated the use of a manipulator to pull the suspended electrodes so that the released outer-layers slide away from each other, effectively increasing the length of the MWCNT. The position of the manipulator was carefully chosen so that it would not perturb the heat profile of the thermal conductivity test fixture. It is not considered necessary that the e-beam form a complete ring of disrupted layers. Pulling the nanotube apart has been found to complete a disjunction of the outer layers to allow them to separate axially.

From TEM imaging, the MWCNT investigated had outer diameter=9.6 nm, inner diameter=7.2 nm and length=2.73 µm. The upper part of FIG. 4 shows a series of representative SEM images of a MWCNT undergoing the cyclic sliding processes. The increasing length of the visible thin section of the MWCNT suggests that the outer-layers slide against the inner cores and also excludes the presence of the axial strain in the MWCNT. The thermal conductivity of the original MWCNT was measured to be 1100 W/mK. After electron beam irradiation, the thermal conductivity reduces to 380 W/mK, equivalent to $K=4.4\times10^{-9}$ W/K. The lower panel of FIG. 4 shows the measured K at different time frames. K is normalized to its initial value of $4.4\times10^{-9}$ W/K. Notably, the minimum of K is only 15% of the initial value. Furthermore, the sliding process is fully reversible, as shown in FIG. 4, K returns to its initial value after the MWCNT is restored to its original shape. We do, however, observe hysteresis behavior after a few cycles of the sliding process. TEM imaging shows a thin layer of amorphous material coating the surface of the MWCNT, possibly causing the hysteresis. Ideally, as it has been demonstrated in previous experiments (see Cummings et al., Low-Friction Nanoscale Linear Bearing Realized from Multiwall Carbon Nanotubes." *Science*, 289, 602 (2000)) the sliding motion can go many cycles without wearing. Thus the performance of the MWCNT thermal device can be improved if operated in a cleaner environment.

FIG. 4 shows the normalized thermal resistance (1/K) with respect to the distance between the electrodes. At the beginning, increasing the distance between the electrodes only straightens the MWCNT but does not affect its thermal resistance. This is consistent with the previous experimental results showing that MWCNTs can sustain high thermal conductivity at very large bending angles [9]. Notably, when the outer shells of the MWCNT start to slide with respect to the inner core, the thermal resistance increases dramatically. Due to the limited data points available, we cannot constrain a specific fitting curve here. For comparison purposes, previous electrical resistance measurements on telescopically extended MWCNTs have found an exponential form for the electrical resistance behavior $$R(x)=R_o\exp(2x/l_e) \quad (2)$$

where x is the sliding distance, $l_e$=1000~1500 nm is the electronic localization length [3]. If we adapt the same formula to fit the data in FIG. 4, we find that the phononic localization length $l_{ph}$=87 nm, which is much shorter than $l_e$. The result suggests that for MWCNTs K is more sensitive to telescopic modulation than the electrical resistance.

The change of K does not scale with the extended length of the MWCNT, so the observed phenomenon is not like stretching a rubber band. Besides, a thermal diffusive model based on the geometry of the investigated MWCNT predicts that K only decreases by 23% after extending by 190 nm, which is much smaller than the observed value (85%). For longer tubes, which allow more extension, the conductance change factor can be much larger. Because thermal conductivity of nanotubes is dominated by long-wavelength phonons, effects due to wave phenomena, such as interference, tunneling, or localization are more pronounced than other materials. Thus it may be seen that the present structures provide a significant drop in heat conductance with a very small change in linear distance between the ends of the structure. This may be the observed change of about 85% at 200 nm change, or in a range of 50% to 100% drop when measured over a distance change of 100 to 300 nm.

In summary, we have controllably and reversibly tuned the thermal conductance of a MWCNT by sliding the outer shells with respect to their inner cores. The thermal conductance of the MWCNT decreases by 85% after extending the length by 190 nm. An effective thermal diffusive model suggests that the phonon transport of the telescopically extended MWCNT is limited by the region where the outer shells and inner cores overlap, while it is nearly ballistic in the rest of the MWCNT.

CONCLUSION

The above specific description is meant to exemplify and illustrate the invention and should not be seen as limiting the scope of the invention, which is defined by the literal and equivalent scope of the appended claims. Any patents or publications mentioned in this specification are indicative of levels of those skilled in the art to which the patent or publication pertains as of its date and are intended to convey details of the invention which may not be explicitly set out but which would be understood by workers in the field. Such patents or publications are hereby incorporated by reference to the same extent as if each was specifically and individually incorporated by reference, such incorporation being for the purpose of further elucidating, describing or enabling the method or material referred to.

What is claimed is:

1. A tunable nanoscale device for varying heat transfer between a heat source and a heat drain, comprising:
    (a) a multiwalled nanotube structure having a continuous first axial length and an adjacent, discontinuous second axial length, permitting relative movement of walls of the multiwalled nanotube structure to form an exposed portion having a length along the first axial length;
    (b) a heat source attached to one axial end of the multiwalled nanotube structure;
    (c) a heat drain attached to an opposite end of the multiwalled nanotube structure; and
    (d) a moveable member for expanding said exposed portion to reduce the heat transfer by increasing the length of the exposed portion of the multiwalled nanotube structure attached to said heat source and to said heat drain; and
    (e) a sensor, responsive to thermal conditions, connected to a controller constructed to vary thermal transmission between the heat source and the heat drain by actuating the moveable member.

2. The device of claim 1 where the multiwalled nanotube structure comprises an MWCNT.

3. The device of claim 1 wherein the multiwalled nanotube structure comprises an array of independent multiwalled nanotube structures in parallel.

4. The device of claim 1 wherein the multiwalled nanotube structure comprises an array of graphitic sheets.

5. The device of claim 1 comprised in an insulating layer and the controller operative for expanding said gap to increase insulation.

6. The device of claim 1 further comprising an integrated circuit attached to the heat drain, whereby the device carries away heat from the integrated circuit.

7. The device of claim 1 wherein the controller comprises a piezoelectric control for controlling the length of the exposed portion.

8. The device of claim 1 wherein the multiwalled nanotube structure comprises multiwalled nanotube structures comprising nonconcentric walls.

9. The device of claim 1 wherein the heat transfer is reduced by at least 50% by expanding said exposed portion gap by about 200 nm.

10. The device of claim 1 wherein the moveable member also may contract said exposed portion to increase heat transfer.

11. A method for making a tunable thermal link as defined in claim 1, comprising the steps of:
    (a) obtaining a multiwalled nanotube structure;
    (b) breaking at least one outer layer but not inner layers of said multiwalled nanotube structure, thereby forming a multiwalled nanotube structure with relatively moveable layers; and
    (c) mounting the multiwalled nanotube structure with relatively moveable layers to a heat source on one end and a heat drain on an opposite end, at least one of the heat drain or the heat source being moveable in relation to the other in conjunction with movement of the relatively moveable layers.

12. The method of claim 11 where said breaking is done with an electron beam.

13. The method of claim 11 further comprising the step of mounting at least one of the heat source and the heat drain on a piezoelectric material.

* * * * *